H. M. COX.
Horse-Power for Operating Pumps.
No. 218,938.    Patented Aug. 26, 1879.
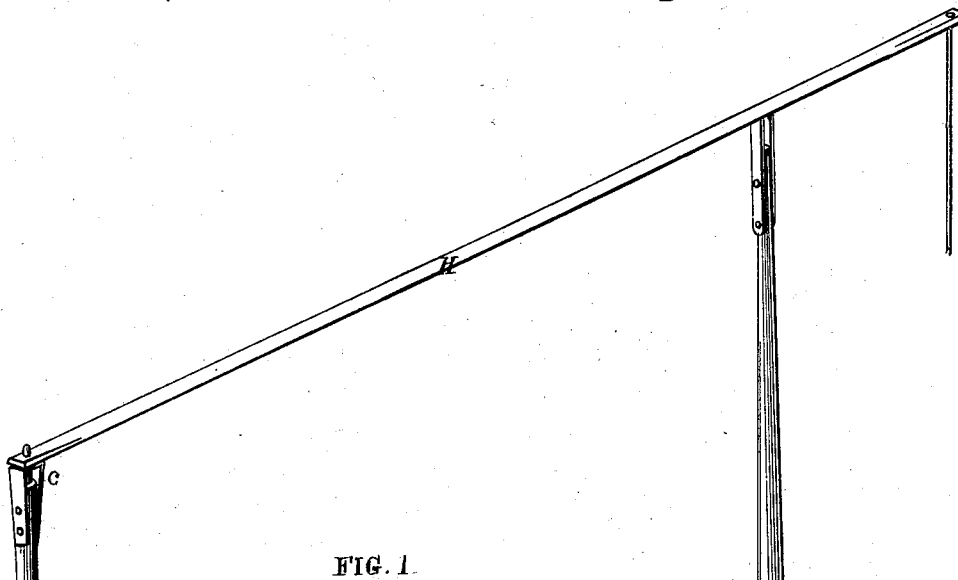
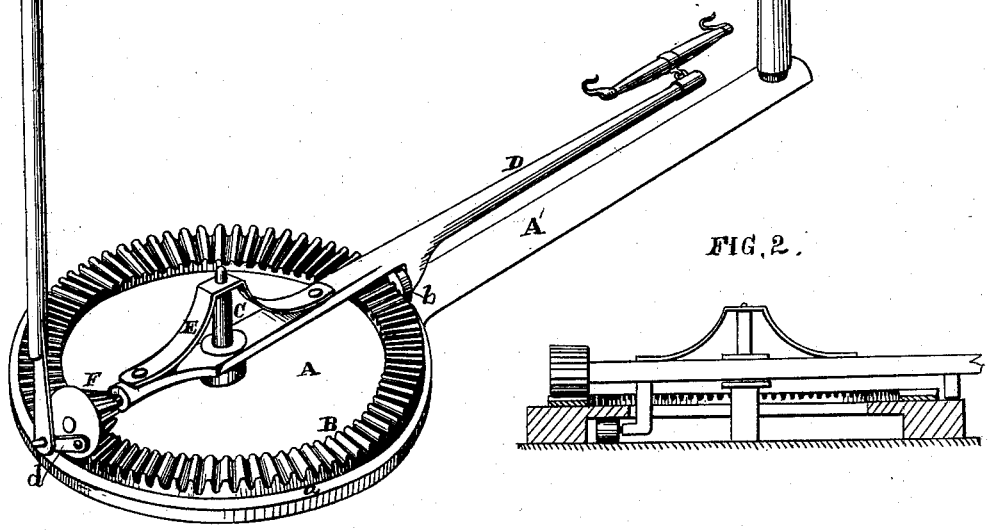
Witnesses
Geo. H. Strong.
Frank A. Brooks.
Inventor
Henry M. Cox
by Dewey & Co.
Attys.

UNITED STATES PATENT OFFICE.

HENRY M. COX, OF LINDEN, CALIFORNIA.

IMPROVEMENT IN HORSE-POWERS FOR OPERATING PUMPS.

Specification forming part of Letters Patent No. 218,938, dated August 26, 1879; application filed February 6, 1879.

*To all whom it may concern:*

Be it known that I, HENRY M. COX, of Linden, county of San Joaquin, and State of California, have invented an Improved Horse-Power for Operating Pumps; and I hereby declare the following to be a full, clear, and exact description thereof.

My invention relates to an improved horse-power for operating pumps; and my improvements consist in the employment of a bevel or crown wheel, which is fixed upon a bed with its teeth uppermost. A central spindle arises from this wheel, and an arm or lever mounted upon this spindle extends across above the gear-wheel, having an attachment for the horse at one end, while a pinion at the other is mounted to rotate upon its axis by meshing with the teeth of the large wheel while the lever is carried around by the movement of the horse. A crank-arm upon the pinion is united by a pitman and universal joint with a balance-beam above, and the action of the crank causes it to oscillate so as to operate a pump at the opposite end. A roller or slide below the lever-arm and opposite to the pinion moves upon a circular track, and thus holds the pinion in gear at all times, so that it will not throw out or slip with the heaviest work, which is an important point.

Referring to the accompanying drawings for a more complete explanation of my invention, Figure 1 is a view of my apparatus. Fig. 2 is a modification of the same.

On a suitable bed-piece or foundation, A, is placed a crown-wheel, B, said wheel being bolted to the bed-piece with its teeth projecting upward, as shown. In the center of this bed-piece is the stationary pivot C, having shoulders formed on it, as shown, for the purpose hereinafter described.

The lever-bar D, to which the horse is attached, slips over the pivot C and rests on the lower shoulder of the pivot. A curved strap, E, attached to the top of the lever-bar, also slips over said pivot, and its center rests on the upper shoulder, as shown, this strap serving to steady the bar as it is revolved around the pivot.

At the outer end of the lever is journaled a pinion, F, which meshes with the teeth in the crown-wheel B, and is revolved by engaging with said teeth as the other end of the bar is moved about its axis by the motion of the horse.

On the bed-plate, outside the periphery of the crown-wheel, is a space or flange, $a$, on which rolls the roller $b$, attached to the under side of the lever-bar D, so as to furnish a bearing for the bar on that side of the pivot and more readily keep said bar in a horizontal position. This roller also reduces the friction on the central pivot, and serves to keep the pinion at the other end of the bar always in contact with the crown-wheel.

A timber or foundation-piece, A', extends out to one side of the bed-piece A, on which is secured the upright G. On top of this upright is hinged the oscillating pump-lever H. At one end of this lever is pivoted, as shown at $c$, the pitman I, the lower end of said pitman being journaled to the crank $d$ on the pinion F. At the other end of the lever H is hinged the pump-rod, connected with the pump in the well.

The operation of my device is as follows: The horse is hitched to the end of the long arm of the lever-bar D, and in moving in a circle about the pivot C the pinion on the other end of said bar is rapidly rotated by its teeth engaging with those on the crown or bevel wheel. This rotation of the pinion operates vertically the pitman by its crank-connection with said pinion, thus oscillating the pump-lever and operating the pump.

The pitman is pivoted, or has a universal joint, at its upper end in the pump-lever, so that said pitman may rotate as it is carried around the circle.

I am aware that pumps have been operated by a centrally-pivoted walking-beam, one end of which is connected to the pump-rod by a pitman, and the opposite end with a crank-wheel by a similar pitman. In that case the crank-wheel is secured at the end of a horizontal shaft, which is supported by a suitable standard near the crank-wheel. The outer end of the shaft has a large traction-wheel mounted on it, and a horse hitched to the shaft near the traction-wheel, by walking around, rotates the traction-wheel, and the motion is transmitted through crank-wheel, pitman, oscillating beam, and pitman to a pump. In that case the power and motion are derived from the traction-wheel near where the horse is hitched, and it depends on the weight of the wheel for power and motion, and in case there is much lift to be overcome the traction-wheel will slip.

In my invention the motion is derived from the pinion and crown-wheel, and I can get a quick rotation of the pinion by a positive motion. When it is necessary to work a large pump it can be done without any danger of the pinion slipping, and by increasing the size of the crown-wheel a more rapid motion may be imparted without any special increase of power being necessary.

This device is simple and easily constructed. It is specially adapted for application to pumps; but the oscillating lever may be applied to moving other articles than pumps.

Having thus described my invention, I do not claim, broadly, the operation of a pump by means of an oscillating beam actuated by a crank-wheel and horse-power alone, nor do I claim a fixed crank-shaft and a movable master-wheel; but

What I do claim as new, and desire to secure by Letters Patent, is—

1. The apparatus consisting of the stationary crown or bevel wheel B, with its central stem or spindle, C, in combination with the lever-arm D, turning upon this spindle, and having the pinion F at one end, while the wheel or roller $b$ travels upon a track beneath the lever, so as to hold the pinion in contact with the teeth of the wheel and prevent slip and loss of power, substantially as herein described.

2. The horse-power lever D, having the crank-pinion F at one end, meshing with the stationary crown-wheel B below, and the counter-wheel $b$, in combination with the oscillating beam H and the pitman I, with its universal connecting-joint, whereby a pumping apparatus is formed, substantially as herein described.

In witness whereof I have hereunto set my hand and seal.

HENRY M. COX. [L. S.]

Witnesses:
DAVID HARRISON,
JOHN PATTERSON.